(12) United States Patent
Yang

(10) Patent No.: US 12,141,008 B2
(45) Date of Patent: Nov. 12, 2024

(54) VOLTAGE PUMP CIRCUIT AND METHOD SUPPORTING POWER-DOWN DATA PROTECTION

(71) Applicant: INSPUR SUZHOU INTELLIGENT TECHNOLOGY CO., LTD., Jiangsu (CN)

(72) Inventor: Kai Yang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/016,953

(22) PCT Filed: Feb. 19, 2021

(86) PCT No.: PCT/CN2021/076834
§ 371 (c)(1),
(2) Date: Jan. 19, 2023

(87) PCT Pub. No.: WO2022/016858
PCT Pub. Date: Jan. 27, 2022

(65) Prior Publication Data
US 2024/0272693 A1    Aug. 15, 2024

(30) Foreign Application Priority Data

Jul. 24, 2020  (CN) .......................... 202010725807.7

(51) Int. Cl.
*G06F 1/30*        (2006.01)
(52) U.S. Cl.
CPC ..................................... *G06F 1/30* (2013.01)
(58) Field of Classification Search
CPC ............................... G06F 1/30; G06F 11/1456
(Continued)

(56) References Cited

U.S. PATENT DOCUMENTS

2009/0303630 A1* 12/2009 Zhou .................... G11B 19/047
2016/0048182 A1    2/2016 Liu
(Continued)

FOREIGN PATENT DOCUMENTS

CN    104377806 A    2/2015
CN    105846541 A    8/2016
(Continued)

OTHER PUBLICATIONS

Corresponding International Patent Application No. PCT/CN2021/076834, International Search Report, Date Mailed May 7, 2021.
(Continued)

*Primary Examiner* — Chun Cao
(74) *Attorney, Agent, or Firm* — Cooper Legal Group, LLC

(57) ABSTRACT

A voltage pump circuit and method for supporting power-down data protection. The circuit includes: a first capacitor connected to a voltage source; a second capacitor connected to the first capacitor by a second metal oxide semiconductor (MOS); a boost chopper connected to the voltage source and the first capacitor and connected to the second capacitor by a first MOS; a buck chopper connected to the second capacitor and a hard disk; a logic chip connected to the voltage source, the first MOS and the second MOS, where the logic chip is configured to control on or off of the first MOS and the second MOS according to voltage information of the voltage source to realize normal power supply to the hard disk for a normal voltage source, and to prolong power supply time to the hard disk for an abnormal and closed voltage source to save cache data.

20 Claims, 2 Drawing Sheets

(58) Field of Classification Search
USPC .................................. 713/300, 340; 714/14
See application file for complete search history.

(56) References Cited

U.S. PATENT DOCUMENTS

| | | | |
|---|---|---|---|
| 2017/0091042 A1* | 3/2017 | Chou | G06F 11/1441 |
| 2018/0032390 A1* | 2/2018 | Rahmanian | G06F 11/0754 |
| 2021/0265913 A1* | 8/2021 | Cannillo | H02M 3/158 |

FOREIGN PATENT DOCUMENTS

| | | | | |
|---|---|---|---|---|
| CN | 107844716 A | | 3/2018 | |
| CN | 208384559 A | | 1/2019 | |
| CN | 109564457 A | | 4/2019 | |
| CN | 109582498 A | | 4/2019 | |
| CN | 110635689 A | | 12/2019 | |
| CN | 110718959 A | * | 1/2020 | ............... G06F 1/30 |
| CN | 111857317 A | | 10/2020 | |
| IN | 109245240 A | | 1/2019 | |

OTHER PUBLICATIONS

Corresponding International Patent Application No. PCT/CN2021/076834, Written Opinion, Date Mailed May 7, 2021.
Corresponding Chinese Patent Application No. 202010725807.7, Notification to Grant Patent, Date Mailed Jun. 15, 2022.

* cited by examiner

VOLTAGE PUMP CIRCUIT AND METHOD SUPPORTING POWER-DOWN DATA PROTECTION

This application claims priority to Chinese Patent Application No. 202010725807.7, filed on Jul. 24, 2020 in China National Intellectual Property Administration and entitled "Voltage Pump Circuit and Method Supporting Power-down Data Protection", which is hereby incorporated by reference in its entirety.

FIELD

The present disclosure relates to a technical field of servers, in particular to a voltage pump circuit and method supporting power-down data protection.

BACKGROUND

Data are very important resources in present digital systems, such as switches and servers. Some key data are even far beyond a machine itself. Therefore, in terms of protecting data loss, any improvement is worth, even regardless of price. A key data saving strategy is recording in a hard disk. However, data run in a memory, a Random Access Memory (RAM), or the like cannot be saved when power is off, and the working time of a hard disk to which the unsaved data are to be saved shall be prolonged at sudden crash of a system. From normal work to abnormal crash of the system, energy temporarily stored in the system comes from capacitors of the system, energy consumption of each component is constant during normal work, and the energy shall be allocated to the hard disk preferentially at the moment of system crash.

In a general switch and server system, all levels of power supplies, such as 12 V, 5 V, and 3.3 V, are stabilized by output capacitors. When the system crashes, all levels of the power supplies will substantially power down at the same time, so all chips in the system are powered on and off at the same time. However, because the energy on capacitors is limited after abnormal power-down, average consumption will waste most of the energy, the system will lose power quickly, and all useful data cannot be saved in time, causing data loss.

Many capacitors need to be placed in order to continue the system until cached data are saved in a hard disk and ensure no loss of data in the crash. However, this method may not be always effective. Because energy consumed by a whole system in ordinary capacitors shall last long enough, and many capacitors are required. Moreover, space increase caused by arrangement of capacitors may make this method impossible to realize. Therefore, in the existing design, it is difficult to achieve the time required to save data.

SUMMARY

In view of this, embodiments of the present disclosure aim to provide a voltage pump circuit, which may have enough time to complete the transfer of cache data to a hard disk for storage at the moment of system crash.

Based on the above objective, one aspect of the present disclosure provides a voltage pump circuit for supporting power-down data protection, the circuit including:
 a first capacitor connected to a voltage source;
 a second capacitor connected to the first capacitor by means of a second MOS;
 a boost chopper connected to the voltage source and the first capacitor respectively and connected to the second capacitor by means of a first MOS;
 a buck chopper connected to the second capacitor and a hard disk respectively; and
 a logic chip connected to the voltage source and connected to the first MOS and the second MOS respectively,
 where the logic chip is configured to control on or off of the first MOS and the second MOS according to voltage information of the voltage source, so as to realize normal power supply to the hard disk under a condition that the voltage source is normal, and to prolong power supply time to the hard disk under a condition that the voltage source is abnormal and turned off, whereby the hard disk completes saving system cache data.

In some implementations of the voltage pump circuit for supporting power-down data protection according to the present disclosure, the circuit further includes:
 a third capacitor connected to the hard disk and connected to the second capacitor by means of the buck chopper to filter supply voltage of the hard disk.

In some implementations of the voltage pump circuit for supporting power-down data protection according to the present disclosure, the circuit further includes:
 a first diode connected to the second capacitor, connected to the boost chopper by means of the first MOS, and configured to prevent current from flowing backward from the second capacitor to the boost chopper; and
 a second diode connected to the second capacitor, connected to the first capacitor by means of the second MOS, and configured to prevent the current from flowing backward from the second capacitor to the first capacitor.

In some implementations of the voltage pump circuit for supporting power-down data protection according to the present disclosure, the logic chip is further configured to:
 under a condition that the logic chip detects that the voltage information of the voltage source is normal, control the second MOS to turn on and the first MOS to turn off, so as to supply power to the second capacitor by means of the voltage source.

In some implementations of the voltage pump circuit for supporting power-down data protection according to the present disclosure, the logic chip is further configured to:
 under a condition that the logic chip detects that the voltage information of the voltage source is abnormal, control the second MOS to turn off and the first MOS to turn on, whereby the first capacitor supplies power to the second capacitor after boosting by the boost chopper.

In some implementations of the voltage pump circuit for supporting power-down data protection according to the present disclosure, the boost chopper is further configured to:
 under a condition that the logic chip detects that the voltage information of the voltage source is abnormal, boost the voltage of the first capacitor to a first preset voltage, so as to charge the second capacitor by means of the first preset voltage.

In some implementations of the voltage pump circuit for supporting power-down data protection according to the present disclosure, the buck chopper is further configured to:
 buck a voltage of the second capacitor to a second preset voltage, so as to supply power to the hard disk by means of the second preset voltage.

Another aspect of the embodiments of the present disclosure further provides a method for supporting power-down data protection, the method including:

detecting voltage information of a voltage source by a logic chip;

in response to a detection that the voltage information is normal, controlling, by the logic chip, the voltage source to charge a first capacitor and a second capacitor, and providing supply voltage for a hard disk by the voltage source;

in response to a detection that the voltage information is abnormal, controlling, by the logic chip, a voltage provided by the first capacitor to be boosted to a first preset voltage by a boost chopper, charging the second capacitor by means of the first preset voltage, and providing the supply voltage for the hard disk by the second capacitor; and bucking the supply voltage to a second preset voltage by a buck chopper, and supplying power to the hard disk by means of the second preset voltage.

In some implementations of the method for supporting power-down data protection according to the present disclosure, the method further includes:

connecting the boost chopper and the second capacitor to each other by means of a first MOS, connecting the first capacitor and the second capacitor to each other by means of a second MOS, and controlling on or off of the first MOS and the second MOS according to the voltage information detected by the logic chip, so as to select a circuit path for supplying power to the hard disk.

In some implementations of the method for supporting power-down data protection according to the present disclosure, the method further includes:

connecting the second capacitor and the boost chopper to each other by means of a first diode, and configuring the first diode to prevent current from flowing backward from the second capacitor to the boost chopper; and connecting the second capacitor and the first capacitor to each other by means of a second diode, and configuring the second diode to prevent the current from flowing backward from the second capacitor to the first capacitor.

The present disclosure has at least following beneficial technical effects: the present disclosure can provide a concrete and feasible protection strategy for key cache data, ensure no loss of key data, and ensure no loss of cache data in addition to basic data protection such as hard disk backup in terms of improving system reliability, especially in key fields such as finance and important data occasions, thereby greatly improving the reliability.

BRIEF DESCRIPTION OF THE DRAWINGS

In order to describe the technical solutions in the embodiments of the present disclosure or in the prior art more clearly, drawings required to be used in the illustration of the embodiments or the prior art will be briefly introduced below. Apparently, the drawings in the illustration below are some embodiments of the present application. Those ordinarily skilled in the art also can obtain other drawings according to the provided drawings without creative work.

DETAILED DESCRIPTION

In order to make the objectives, technical solutions and advantages of the present disclosure clearer, the embodiments of the present disclosure will be described in detail below in conjunction with embodiments and the drawings.

It should be noted that all expressions of "first" and "second" in the embodiments of the present disclosure are used to distinguish two different entities or parameters with the same name. It can be seen that "first" and "second" are for the convenience of expression, should not be understood as limiting the embodiments of the present disclosure, and will not be explained one by one in subsequent embodiments.

Figure 1:
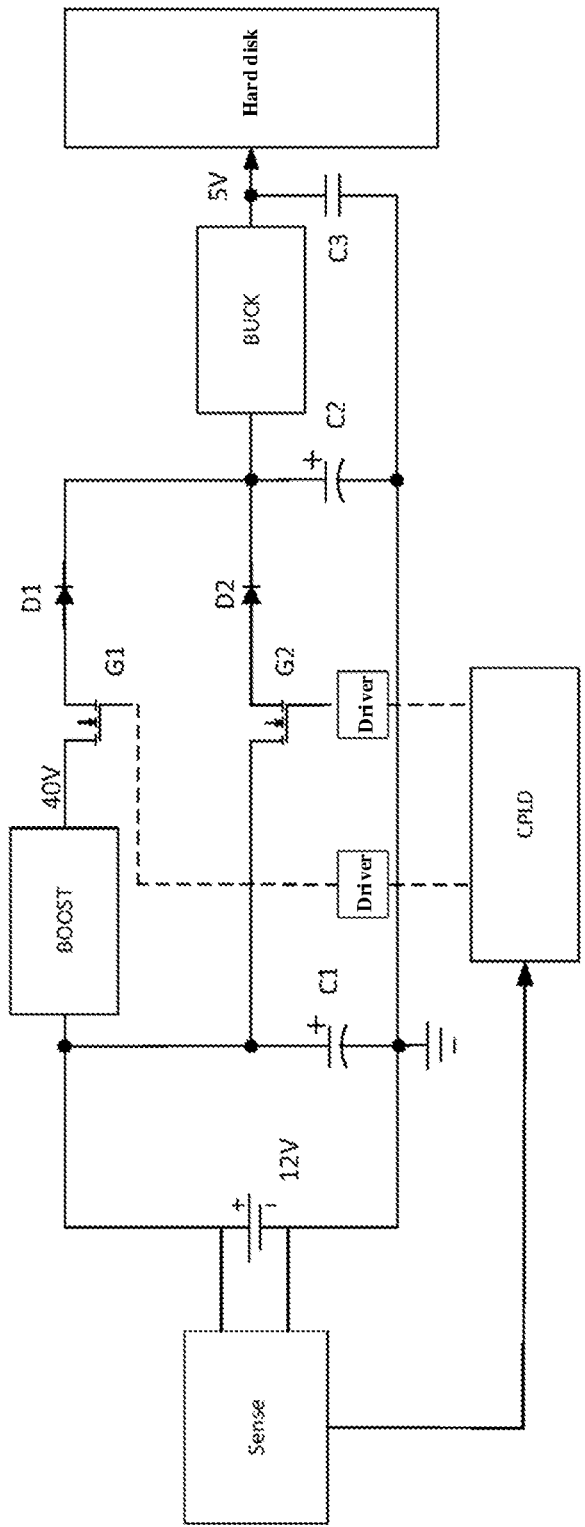
FIG. 1 illustrates a schematic diagram of a circuit structure in some embodiments of a voltage pump circuit for supporting power-down data protection according to the present disclosure.

Based on above objective, an aspect of embodiments of the present disclosure provides an embodiment of a voltage pump circuit for supporting power-down data protection. FIG. 1 illustrates a schematic diagram of a circuit structure in some embodiments of the voltage pump circuit for supporting the power-down data protection according to the present disclosure. As shown in FIG. 1, the voltage pump circuit for supporting the power-down data protection includes:

a first capacitor connected to a voltage source: a second capacitor connected to the first capacitor by means of a second metal oxide semiconductor (MOS, metal-oxide-semiconductor field effect transistor); a boost chopper connected to the voltage source and the first capacitor respectively and connected to the second capacitor by means of a first MOS: a buck chopper connected to the second capacitor and a hard disk respectively: and a logic chip connected to the voltage source and connected to the first MOS and the second MOS respectively, in some embodiments, the logic chip is configured to control on or off of the first MOS and the second MOS according to voltage information of the voltage source, so as to realize normal power supply to the hard disk under a condition that the voltage source is normal, and to prolong power supply time to the hard disk under a condition that the voltage source is abnormal and turned off, whereby the hard disk completes saving system cache data.

In some embodiments of the present disclosure, at a moment of system crash, energy on 12 V capacitors is quickly transferred to a BUCK system that supplies power to the hard disk and its key components, so as to ensure that the hard disk survives for a long enough time until the system cache data are completely saved. As shown in FIG. 1, BUCK (buck chopper) is a BUCK with a wide input range (more than 12 to 40 V), G1 (the first MOS) and G2 (the second MOS) are high-voltage resistant MOSs that withstand a voltage of more than 40 V, D1 (the first diode) and D2 (the second diode) are diodes, C1 (the first capacitor) is a capacitor on a 12 V path of the voltage source, C2 (the second capacitor) is an input capacitor of the BUCK, and C1 and C2 are supercapacitors with high-voltage resistant ranges. Under a condition that the logic chip Complex Programming logic device (CPLD) detects that a 12 V system where the voltage source is located is abnormal, or detects that a 12 V control signal of the voltage source is closed, power supply capacity on the first capacitor indicated by C1 is left on the 12 V path, then G2 is turned off, non-critical components (that is, some components that are not related to the storage of cache data) in the system are turned off, and G1 is turned on, whereby BOOST (boost chopper) charges C2 by means of D1 until the voltage is boosted to a first preset voltage. Because the power of the BUCK system is constant, it can be seen from P=UI that current will decrease. After G1 and G2 are completely turned off due to power-down, when the capacitor C2 supports power supply, because the current decreases significantly due to voltage rise, the duration of power supply by the capacitor will be greatly prolonged. In some other embodiments, if a BOOST with higher output, a BUCK with wider input range and MOSs with higher voltage resistance are selected, the duration will be further greatly prolonged.

According to some implementations of the voltage pump circuit for supporting power-down data protection in the present disclosure, the circuit further includes:

a third capacitor connected to the hard disk and connected to the second capacitor by means of the buck chopper to filter supply voltage of the hard disk.

In some embodiments of the present disclosure, as shown in FIG. 1, C3 (the third capacitor) is a hard disk input capacitor, which is configured to filter the voltage bucked by the BUCK, and then the hard disk is charged by means of the filtered voltage, whereby the input voltage of the hard disk is kept stable.

According to some implementations of the voltage pump circuit for supporting power-down data protection in the present disclosure, the circuit further includes:

a first diode connected to the second capacitor, connected to the boost chopper by means of the first MOS, and configured to prevent current from flowing backward from the second capacitor to the boost chopper; and a second diode connected to the second capacitor, connected to the first capacitor by means of the second MOS, and configured to prevent the current from flowing backward from the second capacitor to the first capacitor.

In some embodiments of the present disclosure, as shown in FIG. 1, D1 (the first diode) and D2 (the second diode) may prevent current from flowing backward, because body diodes of G1 and G2 are reversed and the current can flow from an output end to an input end when the voltage at the output end is high and the voltage at the input end is low. However, the diodes D1 and D2 are unidirectionally conductive, which can prevent the current from flowing backward and prevent energy loss at C2 more effectively.

According to some implementations of the voltage pump circuit for supporting power-down data protection in the present disclosure, the logic chip is further configured to:

when the logic chip detects that the voltage information of the voltage source is normal, control the second MOS to turn on and the first MOS to turn off, so as to supply power to the second capacitor by means of the voltage source.

In some embodiments of the present disclosure, CPLD continuously detects, through a sensor Sense, whether the system is normal, and if the system is normal, G2 is controlled to turn on, G1 is controlled to turn off, and the system works normally.

According to some implementations of the voltage pump circuit for supporting power-down data protection in the present disclosure, the logic chip is further configured to:

when the logic chip detects that the voltage information of the voltage source is abnormal, control the second MOS to turn off and the first MOS to turn on, whereby the first capacitor is boosted by the boost chopper to supply power to the second capacitor.

In some embodiments of the present disclosure, the CPLD controls G2 to turn off and G1 to turn on once a system abnormality is detected. The voltage at the second capacitor C2 begins to rise, and the current input by the BUCK decreases. The voltage drop on the 12 V path accelerates, G1 and G2 are turned off, and cached key data are written to the hard disk. After the writing is completed, the BUCK system loses power and the system stops working. When the system is started normally, the data are recovered.

According to some implementations of the voltage pump circuit for supporting power-down data protection in the present disclosure, the boost chopper is further configured to:

when the logic chip detects that the voltage information of the voltage source is abnormal, boost the voltage of the first capacitor C1 to a first preset voltage, so as to charge the second capacitor by means of the first preset voltage.

In some embodiments of the present disclosure, the first preset voltage is 40 V, that is, when the logic chip CPLD detects that the voltage information of the voltage source is abnormal, the voltage is boosted to the first preset voltage 40 V by the boost chopper, whereby the BOOST (boost chopper) charges C2 by means of D1 until the voltage is boosted to 40 V.

According to some implementations of the voltage pump circuit for supporting power-down data protection in the present disclosure, the buck chopper is further configured to:

buck a voltage of the second capacitor to a second preset voltage, so as to supply power to the hard disk by means of the second preset voltage.

In some embodiments of the present disclosure, the second preset voltage is 5 V, that is, in the BUCK system, the voltage is bucked to 5 V by the buck chopper BUCK, so as to supply power to the hard disk with the voltage of 5 V.

Figure 2:
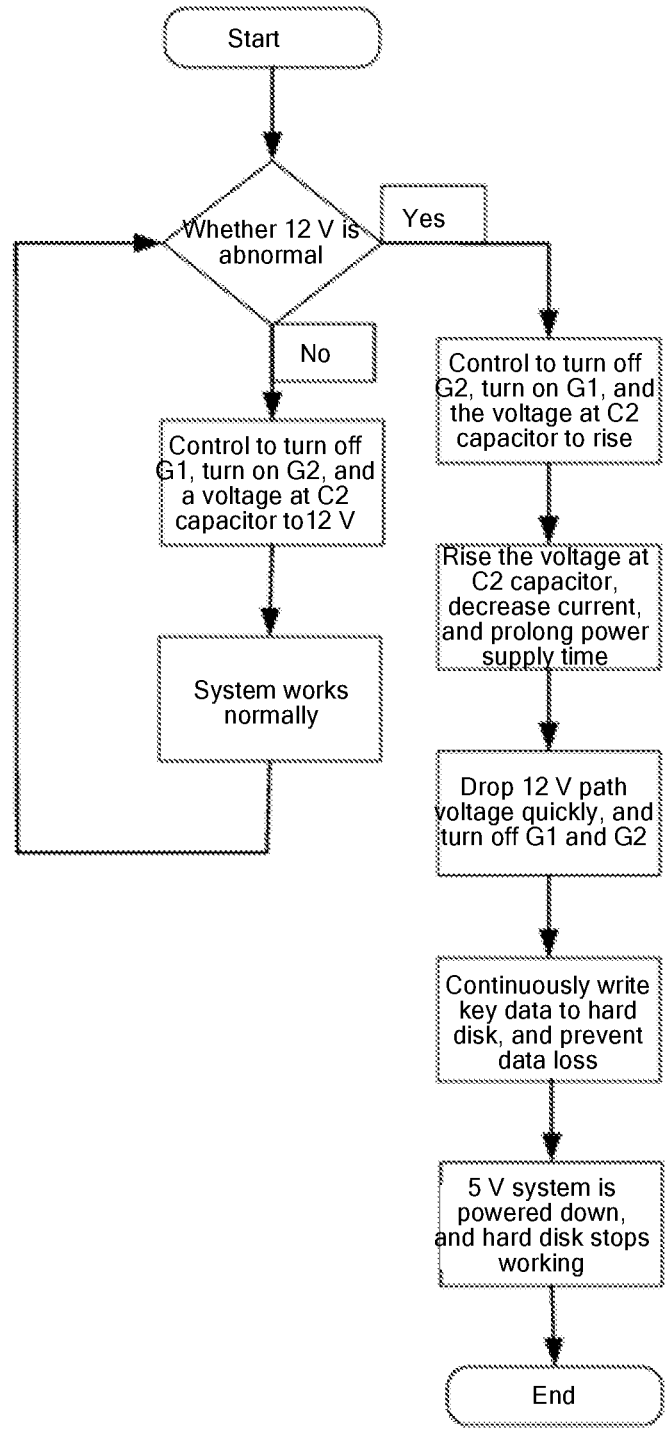
FIG. 2 illustrates a flow chart of some embodiments of the voltage pump design method for supporting the power-down data protection according to the present disclosure.

Another aspect of the embodiments of the present disclosure provides some embodiments of a voltage pump design method for supporting power-down data protection. FIG. 2 illustrates a flow chart of some embodiments of a voltage pump design method for supporting power-down data protection according to the present disclosure. As shown in FIG. 2, the method includes:

A logic chip detects voltage information of a voltage source;

In response to a detection that the voltage information is normal, the logic chip controls the voltage source to charge a first capacitor and a second capacitor, and the voltage source provides supply voltage for a hard disk;

In response to a detection that the voltage information is abnormal, the logic chip controls a voltage provided by the first capacitor to be boosted to a first preset voltage by a boost chopper, the second capacitor is charged by means of the first preset voltage, and the second capacitor provides the supply voltage for the hard disk; and The supply voltage is bucked to a second preset voltage by a buck chopper, and power is supplied to the hard disk by means of the second preset voltage.

According to some implementations of the voltage pump design method for supporting power-down data protection in the present disclosure, the method further includes:

The boost chopper and the second capacitor are connected to each other by means of a first MOS, the first capacitor and the second capacitor are connected to each other by means of a second MOS, and on or off of the first MOS and the second MOS is controlled according to the voltage information detected by the logic chip, so as to select a circuit path for supplying power to the hard disk.

According to some implementations of the voltage pump design method for supporting power-down data protection in the present disclosure, the method further includes:

The second capacitor and the boost chopper are connected to each other by means of a first diode, and the first diode is configured to prevent current from flowing backward from the second capacitor to the boost chopper; and The second capacitor and the first capacitor are connected to each other by means of a second diode, and the second diode is configured to prevent current from flowing backward from the second capacitor to the first capacitor.

As such, it should be understood by those skilled in the art that all embodiments, features, and advantages set forth above with respect to the voltage pump circuit for supporting power-down data protection according to the present disclosure apply equally to the method according to the present disclosure. For the sake of brevity of the present disclosure, details will not be repeated here.

It should be understood that, as used herein, the singular form "a" is intended to include a plural form as well unless the context clearly supports exceptions. It should also be understood that "and/or" as used herein means any and all possible combinations including one or more items associatively listed.

The foregoing serial numbers of the embodiments of the present disclosure are disclosed for description and do not represent the advantages and disadvantages of the embodiments.

It should be understood by those of ordinary skill in the art that the discussion of any of the above embodiments is exemplary and is not intended to imply that the scope of disclosure of the embodiments of the present disclosure (including the claims) is limited to these examples. Under the idea of the embodiments of the present disclosure, the technical features in the above embodiments or different embodiments may be combined, and there are many other variations in different aspects of the embodiments of the present disclosure as above, which are not provided in detail for brevity. Therefore, any omissions, modifications, equivalent substitutions, improvements, and the like made within the spirit and principles of the embodiments of the present disclosure should be included within the scope of protection of the embodiments of the present disclosure.

The invention claimed is:

1. A voltage pump circuit for supporting power-down data protection, comprising:
   a first capacitor connected to a voltage source;
   a second capacitor connected to the first capacitor by means of a second metal oxide semiconductor (MOS);
   a boost chopper connected to the voltage source and the first capacitor respectively and connected to the second capacitor by means of a first MOS;
   a buck chopper connected to the second capacitor and a hard disk respectively;
   a third capacitor connected to the hard disk and connected to the second capacitor by means of the buck chopper to filter supply voltage of the hard disk; and
   a logic chip connected to the voltage source and connected to the first MOS and the second MOS respectively, wherein
   the logic chip is configured to control on or off of the first MOS and the second MOS according to voltage information of the voltage source, so as to realize normal power supply to the hard disk under a condition that the voltage source is normal, and to prolong power supply time to the hard disk under a condition that the voltage source is abnormal and turned off, whereby the hard disk completes saving system cache data.

2. The voltage pump circuit for supporting power-down data protection according to claim 1, wherein the voltage pump circuit further comprises:
   a first diode connected to the second capacitor, connected to the boost chopper by means of the first MOS, and configured to prevent current from flowing backward from the second capacitor to the boost chopper; and
   a second diode connected to the second capacitor, connected to the first capacitor by means of the second MOS, and configured to prevent the current from flowing backward from the second capacitor to the first capacitor.

3. The voltage pump circuit for supporting power-down data protection according to claim 1, wherein the logic chip is further configured to:
   under a condition that the logic chip detects that the voltage information of the voltage source is normal, control the second MOS to turn on and the first MOS to turn off, so as to supply power to the second capacitor by means of the voltage source.

4. The voltage pump circuit for supporting power-down data protection according to claim 1, wherein the logic chip is further configured to:
   under a condition that the logic chip detects that the voltage information of the voltage source is abnormal, control the second MOS to turn off and the first MOS to turn on, whereby the first capacitor supplies power to the second capacitor after boosting by the boost chopper.

5. The voltage pump circuit for supporting power-down data protection according to claim 1, wherein the boost chopper is further configured to:
   under a condition that the logic chip detects that the voltage information of the voltage source is abnormal, boost a voltage of the first capacitor to a first preset voltage, so as to charge the second capacitor by means of the first preset voltage.

6. The voltage pump circuit for supporting power-down data protection according to claim 1, wherein the buck chopper is further configured to:
   buck a voltage of the second capacitor to a second preset voltage, so as to supply power to the hard disk by means of the second preset voltage.

7. The voltage pump circuit for supporting power-down data protection according to claim 1, wherein the first MOS and the second MOS are high-voltage resistant MOSs.

8. The voltage pump circuit for supporting power-down data protection according to claim 1, wherein the first capacitor and the second capacitor are supercapacitors.

9. The voltage pump circuit for supporting power-down data protection according to claim 8, wherein the first capacitor and the second capacitor are the supercapacitors with high-voltage resistant ranges.

10. The voltage pump circuit for supporting power-down data protection according to claim 1, wherein body diodes of the first MOS and the second MOS are reversed.

11. The voltage pump circuit for supporting power-down data protection according to claim 2, wherein the first diode and the second diode are unidirectionally conductive.

12. A method for supporting power-down data protection, comprising:
   detecting voltage information of a voltage source by a logic chip;
   in response to a detection that the voltage information is normal, controlling, by the logic chip, the voltage source to charge a first capacitor and a second capacitor, and providing supply voltage for a hard disk by the voltage source;

in response to a detection that the voltage information is abnormal, controlling, by the logic chip, a voltage provided by the first capacitor to boost to a first preset voltage by a boost chopper, charging the second capacitor by means of the first preset voltage, and providing the supply voltage for the hard disk by the second capacitor; and bucking by a buck chopper and filtering by a third capacitor the supply voltage to obtain a second preset voltage, and supplying power to the hard disk by means of the second preset voltage.

13. The method for supporting power-down data protection according to claim 12, further comprising:

connecting the boost chopper and the second capacitor to each other by means of a first metal oxide semiconductor (MOS), connecting the first capacitor and the second capacitor to each other by means of a second MOS, and controlling on or off of the first MOS and the second MOS according to the voltage information detected by the logic chip, so as to select a circuit path for supplying the power to the hard disk.

14. The method for supporting power-down data protection according to claim 12, further comprising:

connecting the second capacitor and the boost chopper to each other by means of a first diode, and configuring the first diode to prevent current from flowing backward from the second capacitor to the boost chopper; and connecting the second capacitor and the first capacitor to each other by means of a second diode, and configuring the second diode to prevent the current from flowing backward from the second capacitor to the first capacitor.

15. The method for supporting power-down data protection according to claim 13, wherein the first MOS and the second MOS are high-voltage resistant MOSs.

16. The method for supporting power-down data protection according to claim 12, wherein the first capacitor and the second capacitor are supercapacitors.

17. The method for supporting power-down data protection according to claim 16, wherein the first capacitor and the second capacitor are the supercapacitors with high-voltage resistant ranges.

18. The method for supporting power-down data protection according to claim 13, wherein body diodes of the first MOS and the second MOS are reversed.

19. The method for supporting power-down data protection according to claim 14, wherein the first diode and the second diode are unidirectionally conductive.

20. A voltage pump circuit for supporting power-down data protection, comprising:

a first capacitor connected to a voltage source;

a second capacitor connected to the first capacitor by means of a second metal oxide semiconductor (MOS);

a boost chopper connected to the voltage source and the first capacitor respectively and connected to the second capacitor by means of a first MOS;

a buck chopper connected to the second capacitor and a hard disk respectively;

a first diode connected to the second capacitor, connected to the boost chopper by means of the first MOS, and configured to prevent current from flowing backward from the second capacitor to the boost chopper;

a second diode connected to the second capacitor, connected to the first capacitor by means of the second MOS, and configured to prevent the current from flowing backward from the second capacitor to the first capacitor; and a logic chip connected to the voltage source and connected to the first MOS and the second MOS respectively, wherein the logic chip is configured to control on or off of the first MOS and the second MOS according to voltage information of the voltage source, so as to realize normal power supply to the hard disk under a condition that the voltage source is normal, and to prolong power supply time to the hard disk under a condition that the voltage source is abnormal and turned off, whereby the hard disk completes saving system cache data.

* * * * *